US012723568B2

(12) United States Patent
Petersen et al.

(10) Patent No.: US 12,723,568 B2
(45) Date of Patent: Sep. 1, 2026

(54) AUXILIARY POWER SYSTEM AND CONTROL FOR RURAL AND/OR OFF GRID WIND TURBINES

(71) Applicant: Siemens Gamesa Renewable Energy A/S, Brande (DK)

(72) Inventors: Jesper Elliot Petersen, Oelgod (DK); Johnny Soerensen, Videbaek (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 19/110,658

(22) PCT Filed: Sep. 21, 2023

(86) PCT No.: PCT/EP2023/076127

§ 371 (c)(1),
(2) Date: Mar. 11, 2025

(87) PCT Pub. No.: WO2024/074317

PCT Pub. Date: Apr. 11, 2024

(65) Prior Publication Data

US 2026/0078737 A1 Mar. 19, 2026

(30) Foreign Application Priority Data

Oct. 4, 2022 (EP) .................................... 22199540

(51) Int. Cl.
*F03D 9/25* (2016.01)
*F03D 7/04* (2006.01)
(Continued)

(52) U.S. Cl.
CPC ............ *F03D 9/257* (2017.02); *F03D 7/048* (2013.01); *F03D 9/11* (2016.05); *F03D 80/003* (2023.08); *F03D 80/50* (2016.05); *F05B 2220/61* (2013.01)

(58) Field of Classification Search
CPC ... F03D 7/048; F03D 9/11; F03D 9/19; F03D 9/255; F03D 9/257; F03D 80/003; F03D 80/50; C25B 1/04; F05B 2220/61
See application file for complete search history.

(56) References Cited

U.S. PATENT DOCUMENTS 7,667,343 B2 * 2/2010 Oohara ................. F03D 7/0272 290/44
8,841,796 B2 * 9/2014 Rosenvard .............. F03D 7/048 307/41
(Continued)

FOREIGN PATENT DOCUMENTS

EP 3760860 A1 * 1/2021 ............. F03D 13/20
EP 3533127 B1 12/2021
(Continued)

OTHER PUBLICATIONS

PCT International Search Report and Written Opinion of International Searching Authority mailed Dec. 18, 2023 corresponding to PCT International Application No. PCT/EP2023/076127 filed Sep. 21, 2023.

(Continued)

*Primary Examiner* — Sang K Kim

(57) ABSTRACT

A wind turbine park includes at least a first wind turbine and a second wind turbine for generating a power product and a main line connecting the first wind turbine and the second wind turbine for transporting the power product. The wind turbine park further includes an auxiliary power line being connected to the first wind turbine and the second wind turbine. The auxiliary power line is configured for transporting auxiliary power for a wind turbine maintenance or standby operation to at least one of the first wind turbine and the second wind turbine. The wind turbine park further
(Continued)

includes an auxiliary power unit for generating the auxiliary power. The auxiliary power unit is connected to the auxiliary power line.

14 Claims, 2 Drawing Sheets

(51) Int. Cl.

| | |
|---|---|
| ***F03D 9/11*** | (2016.01) |
| ***F03D 80/00*** | (2016.01) |
| ***F03D 80/50*** | (2016.01) |

(56) References Cited

U.S. PATENT DOCUMENTS

| | | | | |
|---|---|---|---|---|
| 9,030,035 | B2 | 5/2015 | Tripathi et al. | |
| 9,742,191 | B2 * | 8/2017 | Beekmann | H02J 3/28 |
| 12,305,815 | B2 * | 5/2025 | Soerensen | F17D 1/14 |
| 12,410,775 | B2 * | 9/2025 | Dincan | F03D 9/19 |
| 2009/0134625 | A1 * | 5/2009 | Altenschulte | H01B 9/005 290/55 |
| 2014/0225369 | A1 * | 8/2014 | Bodewes | H02P 9/00 290/44 |
| 2015/0263569 | A1 | 9/2015 | Brogan et al. | |
| 2021/0404439 | A1 * | 12/2021 | Kinsella | F03D 9/19 |
| 2022/0003336 | A1 * | 1/2022 | Soerensen | F16L 9/20 |
| 2022/0364546 | A1 * | 11/2022 | Abeyasekera | F03D 7/0284 |
| 2025/0163593 | A1 * | 5/2025 | Lund | C25B 9/65 |

FOREIGN PATENT DOCUMENTS

| | | | |
|---|---|---|---|
| EP | 4056841 | A1 | 9/2022 |
| EP | 4056884 | A1 | 9/2022 |
| WO | 2021023356 | A1 | 2/2021 |
| WO | 2021151643 | A1 | 8/2021 |

OTHER PUBLICATIONS

European Search Report and Written Opinion of European Patent Office corresponding to Application No. 22199540.0 filed Oct. 4, 2022.

* cited by examiner

AUXILIARY POWER SYSTEM AND CONTROL FOR RURAL AND/OR OFF GRID WIND TURBINES

FIELD OF THE INVENTION

The present invention relates to a wind turbine park and to a method of operating the wind turbine park.

ART BACKGROUND

Very large wind and solar projects (within a Gigawatt scale) are being planned in rural areas for hydrogen production. For instance, the large wind and solar hydrogen farm parks are planned in desert zones or other remote locations. Systems located at rural areas are far away from power consumers and a strong electrical grid that are capable of transmitting large amounts of electricity.

Specifically, if the wind turbine is in a standby operation mode, operating power is necessary in order to provide maintenance operations like yawing the nacelle or pitching the blades of the wind turbine. Furthermore, during startup of a wind turbine, additional external power is necessary in order to provide sufficient energy for the electronic equipment of the wind turbine, such as heaters or blade pitch systems.

WO 2021/151643 A1 discloses a system for mitigating standstill vibrations of a wind turbine. The wind turbine comprises an energy storage system such as a Diesel-powered generator. If a disconnection from an auxiliary grid is detected, the energy storage system can be activated or deactivated. Furthermore, an energy storage system may be applied to the wind turbine, wherein the energy storage system has sufficient energy capacity to provide energy for a known duration of time while the wind turbine is off grid.

However, a respective energy storage system and/or power generator on each wind turbine is expensive, heavy, and complicated to maintain, especially at remote areas or in offshore wind turbine parks, where accessibility is limited. Furthermore, a stand still period (for example a couple of days in no wind periods) is limited to the capacity of the storage system.

SUMMARY OF THE INVENTION

It may be an object of the present invention to provide a more efficient auxiliary power system for a wind turbine park.

This object may be solved by a wind turbine park and a method of operating the wind turbine park according to the subject matter of the independent claims.

According to a first aspect of the present invention, a wind turbine park is described comprising at least a first wind turbine and a second wind turbine for generating a power product, such as electrical power or hydrogen. The wind turbine park comprises a main line connecting the first wind turbine and the second wind turbine for transporting the power product and an auxiliary power line being connected to the first wind turbine and the second wind turbine. The auxiliary power line is configured for transporting auxiliary power for a wind turbine maintenance or standby operation to at least one of the first wind turbine and the second wind turbine. The wind turbine park further comprises an auxiliary power unit for generating the auxiliary power to the first wind turbine and the second wind turbine, wherein the auxiliary power unit is connected to the auxiliary power line.

According to a further aspect, a method of operating a wind turbine park as described above is presented. The method comprises generating a power product by at least one of the first wind turbine and the second wind turbine and transporting the power product by the main line. The method further comprises generating auxiliary power by the auxiliary power unit and transporting by the auxiliary power line auxiliary power for a maintenance or standby operation to at least one of the first wind turbine and the second wind turbine.

The wind turbine in the wind turbine park may comprise a wind turbine tower and a respective nacelle, to which rotatable wind turbine blades are coupled. Upon rotation of the blades by wind force in an operating mode of the wind turbine, a generator in the nacelle generates direct current and electrical power, respectively. The generated electrical power is used to produce the power product which can be transported by a mainline to a central storage for the power product, such as huge fluid tanks or power batteries. Additionally, the generated power product may also be transported by the main line to a power product grid, such as an electrical power grid or a respective pipeline system transporting the power product to its final destination.

The power product generated by the respective wind turbines is defined in the present application as a product that is produced by the electrical power generated by the wind turbine generator and/or exported by the wind turbine park. For example, according to an exemplary embodiment, the power product is a power fluid, in particular a liquid or a gas, wherein the main line is a fluid pipe for transporting the generated power fluid. The power product may be hydrogen or oxygen generated by an electrolyzer unit that is operated by the electrical power of the wind turbine.

Accordingly, the main line may be a gas pipeline or a liquid fluid pipeline, such as a pipeline for hydrogen or oxygen in liquid or gaseous form.

Alternatively or additionally, according to a further exemplary embodiment, the power product may be the electrical power generated by the generator of the wind turbine, if the wind turbine park is designed for generating and exporting electrical power. The main line is in this case an electrical power line for transporting the generated electrical power. The power line is configured for transmitting huge power generated by a wind turbine generator. A respective main power line is designed for transmitting the main part of the power produced by the respective wind turbine generators. An on-shore wind turbine generates 3 MW to 5 MW. A modern offshore wind turbine generates for example 10 MW to 15 MW. Accordingly, an onshore or offshore wind park generates in sum between 10 MW to more than 1 GW (Gigawatt), in particular 100 MW to 300 MW power. Hence, the main power line may be designed for transmitting more than 10 MW (Megawatt), specifically more than 100 MW, more than 300 MW MW, more specifically more than 1 GW. If the power product is a gaseous medium, the main line is a respective main pipe having a respective capacity to transport the gas from the wind turbine park.

In contrast to the main line, the auxiliary power line is designed for providing auxiliary power for a wind turbine maintenance or standby operation to the first wind turbine and the second wind turbine. The auxiliary power is needed for standby operation and maintenance operations, such as yawing the nacelle and pitching blades, operating heat units for example for deicing systems of the blade, for energizing electrical components, such as transformers and the like. Specifically, during startup of the wind turbine, auxiliary power is necessary to energize initial startup equipment, such as the yawing or pitching system.

The required auxiliary power for the auxiliary maintenance and standby operation is less than 1 MW for a wind turbine. In particular, the auxiliary power is less than 0, 5 MW, in particular less than 0, 15 MW. In a further exemplary embodiment, the auxiliary power line is designed for transmitting voltage less than 50 kV, specifically less than 10 kV, more specifically less than 1 kV. Accordingly, the auxiliary power line is designed with a smaller capacity and accordingly a smaller diameter than the main power line, for example. This enables more cost-efficient auxiliary power cables.

According to the present invention, the auxiliary power line connects the first wind turbine and the second turbine, and further in particular all wind turbines of the wind turbine park. Hence, all wind turbines of the wind turbine park are coupled to one common auxiliary power line system.

A respective auxiliary power unit is coupled to the auxiliary power line for generating auxiliary power and for transmitting the auxiliary power to the respective wind turbines. In an exemplary embodiment, the wind turbine park comprises exact one auxiliary power unit that can be activated for providing auxiliary power. In a further exemplary embodiment, also further auxiliary power unit may be provided as a backup system, if the main auxiliary power unit fails.

The auxiliary power unit may comprise for example a generator driven by combustible fuel, such as fossil fuel, such as diesel, or hydrogen/oxygen. Additionally or alternatively, the auxiliary power unit is a fuel cell being operated by the power product. The auxiliary power unit may be for example a fuel cell driven by hydrogen and/or oxygen. In this respect, the auxiliary power unit may be driven by green fuel produced by renewable energy, specifically by solar power or wind power, e.g. generated by the wind turbines of the wind turbine park. Examples for green energy are green hydrogen, methanol or ethanol. Furthermore, the auxiliary power unit may comprise a power storage system, such as a chargeable battery system, for example. According to a further exemplary embodiment, the battery is in particular chargeable by electrical power generated by at least one of the first wind turbine and the second wind turbine.

According to the approach of the present invention, a wind turbine park is provided comprising an auxiliary power unit which provides auxiliary power for not only one wind turbine of the wind turbine park but for at least two and for example all wind turbines of the wind turbine park. Hence, it is no longer necessary to provide each wind turbine of the wind turbine park with an auxiliary power unit. Hence, since the auxiliary power unit is part of the wind turbine park and is coupled to the auxiliary power line, the wind turbine park may be decoupled from a supplying power grid.

The wind turbine park for producing for example hydrogen forms a so-called off grid wind turbine park which is configured for converting electricity to hydrogen directly at the wind turbine or at wind farm level and is thus not mandatorily coupled to a supplying external power grid to which the wind park is connected. Such off-grid wind turbines are specifically configured for hydrogen production as power product and needs a huge amount of auxiliary power for stand still periods (e.g. if there is no wind) and for start-up procedure of the wind turbine equipment, such as the electrolyser and related processing equipment like water treatment etc.

Auxiliary power would also be needed to keep the equipment heated to avoid freezing of processing water in the equipment during winter time. The present invention is especially advantageous for such an off-grid turbine since the needed auxiliary power is difficult to supply with a simple battery system on each turbine. It would become too heavy and expensive to have on each turbine respective auxiliary power units. Hence, a respective wind turbine park may be completely decoupled from such a supplying power grid and may receive the necessary auxiliary power from the auxiliary power unit, (in particular one or may be one further auxiliary power unit as fallback system). Hence, the described wind turbine park can be used for wind turbine farms that have no grid connections.

According to a further exemplary embodiment, the auxiliary power line is configured for transmitting less than 1 MW, more particularly less than 500 kW, in particular less than 150 kW. In a further exemplary embodiment, the auxiliary power line is designed for transmitting voltage less than 50 kV, specifically less than 10 kV, more specifically less than 1 kV. The auxiliary power line may withstand a voltage in the range of e.g. 0,690 kV to 10 kV.

Accordingly, the auxiliary power line is designed with a smaller capacity and accordingly a smaller diameter than e.g. the main (power) line, for example. This enables more cost-efficient auxiliary power cables.

According to a further exemplary embodiment, at least one of the first wind turbine and the second wind turbine comprises an electrolyzer unit for generating hydrogen and/or oxygen as power fluid. The electrolyzer unit may be able to generate gas with a sufficient pressure to deliver the gas to an off-shore or onshore installation, so that it is not mandatory to provide respective compressors. However, also further compressors may be installed in the main line, in order to control the efficiency of the gas transportation and in order to control the flow direction of the gas/liquid in the main pipeline.

The electrolyzer unit is fed by a starting (base) material, such as water, and produces by the use of the electrical power generated by the wind turbine generator respective electrolyzed fluid, e.g. gas, such as hydrogen and oxygen. The base material may be provided by supplying pipelines or, e.g. in case of water as base material, from the sea/lake/river or the groundwater. Specifically, the electrolyzer unit generates a first electrolyzed gas, such as hydrogen, which is transported by the main line. Additionally, the electrolyzer unit may generate a second electrolyzed gas, such as oxygen. The second electrolyzed gas may be bled off or may be transported in a further main line. The wind turbine may comprise an optional storage tank for storing the power product before being transported by the main line. The storage tank can be integrated in the turbine structure, e.g. the nacelle, the tower or the foundation of the wind turbine.

According to a further exemplary embodiment, the auxiliary power unit is mounted to the first wind turbine, wherein in particular the second and/or all other wind turbines is/are free of a further auxiliary power unit. In the exemplary embodiment, the wind turbine park comprises exact one auxiliary power unit that can be activated for providing auxiliary power.

According to a further exemplary embodiment, the auxiliary power unit is mounted to an auxiliary power platform being spaced apart from the first wind turbine and the second wind turbine. At a central position of the wind turbine park, a respective auxiliary power platform may be provided for supporting the auxiliary power unit. The auxiliary power platform may be an offshore or onshore platform, i.e. a respective foundation. Hence, standard wind turbines may be provided without having separate installation equipment for supporting the auxiliary power platform.

According to a further exemplary embodiment, the wind turbine park comprises an auxiliary power controller configured for controlling the auxiliary power provided to the first wind turbine and to the second wind turbine (and to all other wind turbines of the wind turbine park, respectively). The auxiliary power controller is configured for determining a maintenance or standby operation of the first wind turbine and the second wind turbine (and of all other wind turbines of the wind turbine park, respectively). The auxiliary power controller is configured for determining the auxiliary power requirements of each single wind turbine and is configured for determining the power output of the auxiliary power unit. Hence, the auxiliary power controller controls on the basis of the available generated auxiliary power the supply of auxiliary power to the respective wind turbines. For example, if sufficient auxiliary power is available, all wind turbines are supplied with auxiliary power in order to conduct maintenance and standby operations. If the sum of the required auxiliary power of the wind turbines exceeds the generated auxiliary power, then the auxiliary power unit is configured for transmitting subsequently the auxiliary power to the respective subsequently. For example, in the first time period, the first wind turbine receives respective auxiliary power by the auxiliary power unit and if the maintenance and standby operating procedures of the first wind turbine have been finished, subsequently in a second time period, the second wind turbine receives respective auxiliary power by the auxiliary power unit.

According to a further exemplary embodiment, the auxiliary power line comprises a predetermined power threshold value for the transported auxiliary power through the auxiliary power line. The power threshold value is in particular less than 500 kW, in particular less than 150 kw. The auxiliary power controller is configured for providing auxiliary power to the first wind turbine and to the second wind turbine under consideration of the predetermined power threshold value.

According to a further exemplary embodiment, the auxiliary power controller is configured to provide auxiliary power subsequently first to the first wind turbine and subsequent to the second wind turbine if the total required auxiliary power of the first wind turbine and the second wind turbine in sum exceeds the power threshold value of the auxiliary power line.

According to a further exemplary embodiment, the auxiliary power controller is configured for controlling the maintenance or standby operation of at least one of the first wind turbine and the second wind turbine.

According to a further exemplary embodiment the maintenance or standby operation comprises a plurality of maintenance or standby tasks, in particular pitch control of a blade of a wind turbine or yaw control of a wind turbine nacelle. The auxiliary power controller is configured for controlling the timing of the maintenance or standby tasks in order to comply with the power threshold value of the auxiliary power line.

Hence, if the design of the auxiliary power line does only allow a maximum threshold value, the auxiliary power controller controls the auxiliary power in such a manner, that the maximum threshold value of the auxiliary power transmitted through the auxiliary power line is met, i.e. that the auxiliary power transmitted through the auxiliary line is below the power threshold value of the auxiliary power line. Hence, by the auxiliary power controller a defect of the auxiliary power line due to transmitting too much auxiliary power through the auxiliary power line is avoided.

Furthermore, according to a further exemplary embodiment, the respective maintenance and standby operations may be categorized and prioritized. For example, respective maintenance and standby operations may have a higher priority than other maintenance and standby operations. For example, a pitch control may be necessary to prevent a hazardous event. If no sufficient auxiliary power is available, the auxiliary power controller first controls the wind turbine just to conduct maintenance or standby operations in order to prevent the hazardous event before controlling the second wind turbine.

According to a further exemplary embodiment, the wind turbine park is decoupled from a power grid. The power grid is defined by a power grid that is provided outside of the wind turbine park and to which the wind turbines are not directly coupled. The power grid operator is for example a respective electricity supplier and not the operator of the wind turbine park. Hence, the wind turbine park according to the present invention can be operated isolated and self-sufficient without the need to be connected to an external power grid.

The present invention could also be used in a HVDC connected wind farm, where the main power is High Voltage Direct current (HDVC) connection but where an auxiliary power line and unit is used for supplying auxiliary power to the turbines. This is especially an advantage in start-up of the wind turbines when the DC between the sub-station of the wind farm and the power grid is not established (commissioned) or not working due to power outage.

Summarizing, the invention solves the problem of having sufficient auxiliary power for standby, start-up and or idling of a wind turbine and/or a number of wind turbines, although the wind turbine park is disconnected from a respective supplying power grid. Hence, a power backup during standstill and startup of remote wind turbines, especially in the case for off-grid wind power systems, is given.

As an example of such an off-grid system is a wind turbine that produces hydrogen via electrolysis directly at the wind turbine. The hydrogen produced is exported via a gas pipeline instead of supplying power to an electrical grid like a normal grid connected turbine. Expensive high-capacity power cables and electrical transmission losses can hereby be avoided by providing the auxiliary power line coupled to a respective auxiliary power unit according to the present invention.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
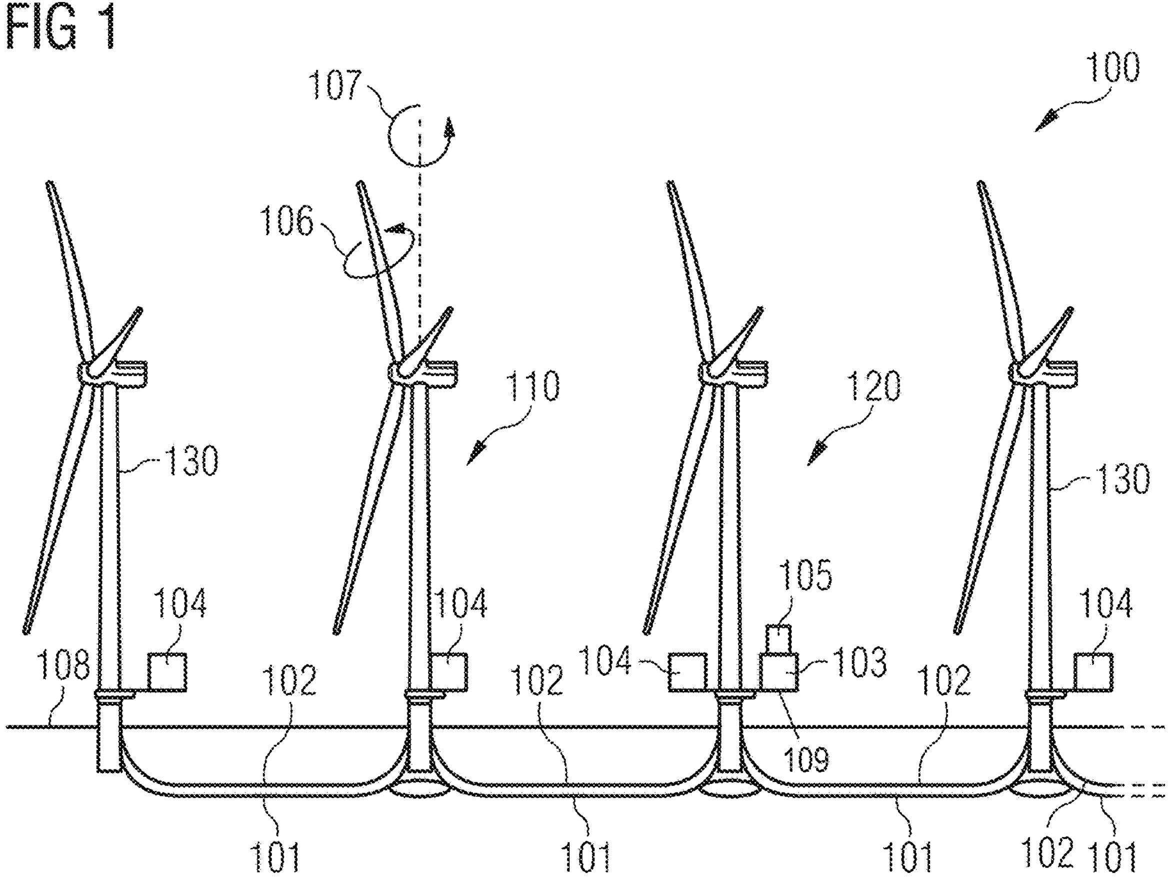
FIG. 1 shows a schematic view of a wind turbine park according to an exemplary embodiment of the present invention.

The illustrations in the drawings are schematically. It is noted that in different figures, similar or identical elements are provided with the same reference signs.

FIG. 1 shows a schematic view of a wind turbine 100 park according to an exemplary embodiment of the present invention. The wind turbine park 100, comprising at least a first wind turbine 110 and a second wind turbine 120 for generating a power product, and a main line 101 connecting the first wind turbine 110 and the second wind turbine 120 for transporting the power product. The wind turbine park 100 further comprises an auxiliary power line 102 being connected to the first wind turbine 110 and the second wind turbine 120, wherein the auxiliary power line 102 is configured for transporting auxiliary power for a wind turbine maintenance or standby operation to at least one of the first wind turbine 110 and the second wind turbine 120. Furthermore, the wind turbine park 100 comprises an auxiliary power unit 103 for generating the auxiliary power, wherein the auxiliary power unit 103 is connected to the auxiliary power line 102.

The wind turbines 110, 120, 130 shown in the wind turbine park 100 comprise a wind turbine tower and a respective nacelle, to which rotatable wind turbine blades are coupled. Upon rotation of the blades by wind force in an operating mode of the wind turbine 110, 120, 130, a generator in the nacelle generates direct current and electrical power, respectively. The generated electrical power is used to produce the power product which can be transported by the mainline 101 to a central storage for the power product, such as huge fluid tanks, or a power product grid 401 (see FIG. 4), e.g. a respective pipeline system exporting the power product out of the wind turbine park 100 to its final destination.

The power product generated by the respective wind turbines 110, 120, 130 is in the exemplary embodiment shown in FIG. 1 a power fluid and the main line 101 is a fluid pipe for transporting the generated power fluid. The power product is e.g. hydrogen or oxygen generated by an electrolyzer unit 104 that is operated by the electrical power of the respective wind turbine 110, 120, 130.

The auxiliary power line 102 connects the wind turbines 110, 120, 130 and is designed for providing auxiliary power for a wind turbine maintenance or standby. The auxiliary power is needed for standby operation and maintenance operations, such as yawing 107 the nacelle and pitching 106 blades, operating heat units for example for deicing systems of the blade, for energizing electrical components, such as transformers and the like.

As can be seen in the exemplary embodiment in FIG. 1, all wind turbines 110, 120, 130 of the wind turbine park are coupled to one common auxiliary power line 102.

In the exemplary embodiment in FIG. 1, one auxiliary power unit 103 is coupled to the auxiliary power line 102 for generating auxiliary power and for transmitting the auxiliary power to the respective wind turbines 110, 120, 130. The auxiliary power unit 103 is mounted in the exemplary embodiment to wind turbine 120 via an auxiliary power platform 109.

The wind turbine park 100 is for example an offshore wind turbine park having the power line 101 and the auxiliary power line 102 below the sea level 108.

The auxiliary power unit 103 is for example a fuel cell driven by hydrogen and/or oxygen generated by the wind turbine 120. The hydrogen and/or oxygen may be the power product generated by the wind turbines 110, 120, 130. For example, the wind turbines 110, 120, 130 comprise respective electrolyzer units 104 for generating hydrogen and/or oxygen as power fluid. From the electrolyzer units 104, the generated hydrogen and/or oxygen is transported by the main line 101 out of the wind turbine park.

The auxiliary power unit 103 may be a fuel cell and is coupled for example to the electrolyzer unit 104 of the wind turbine 120 and/or the adjacent electrolyzer units 104 of the wind turbines 110, 130 in order to receive respective fuel, such as hydrogen or oxygen generated by the electrolyzer 104. Therefore, the auxiliary power unit 103 is coupled by a further source system to the electrolyzer units 104 or is coupled to the main line 101 for receiving the hydrogen and/or oxygen. Specifically, the auxiliary power unit 103 receives hydrogen or oxygen from an electrolyzer unit 104 that is operated by a wind turbine, which is in an operating state. Alternatively, the auxiliary power unit 103 may receive fuel (hydrogen or other combustible fuel, such as Diesel) from a fuel tank. For example, the auxiliary power unit 103 may comprise a fuel cell driven by green fuel produced by renewable energy. Hence, if the auxiliary power unit 103 receives green fuel from a fuel tank, all wind turbines 110, 120, 130 may be in a standby mode. The auxiliary power unit 103 may also comprise a battery, wherein the battery is in particular chargeable by electrical power generated by at least one of the first wind turbines 110, 120, 130.

The electrolyzer units 104 are fed by a base material, such as water, and produces by the use of the electrical power generated by the wind turbine generators of the wind turbines 110, 120, 130 the respective power product, e.g. gas, such as hydrogen and oxygen. The base material may be provided by supplying pipelines or, e.g. in case of water as base material, from the sea/lake/river or the groundwater. Specifically, the electrolyzer unit 104 generates a first electrolyzed gas, such as hydrogen, which is transported by the main line 101. Additionally, the electrolyzer unit may generate a second electrolyzed gas, such as oxygen. The second electrolyzed gas may be bled off or may be transported in a further main line. The wind turbine 110, 120, 130 may comprise an optional storage tank for storing the power product before being transported by the main line 101.

Hence, the auxiliary power unit 103 provides auxiliary power for the wind turbine 120 at which the auxiliary power unit 103 is installed but also for the other wind turbines 110, 130 of the wind turbine park 100. Hence, since the auxiliary power unit 103 is part of the wind turbine park 100 and is coupled to the auxiliary power line 102, the wind turbine park 100 may be decoupled from a supplying power grid and an off-grid wind turbine park 100 configured for converting electricity to hydrogen directly at the location of the wind turbine 110, 120, 130 can be provided.

The wind turbine park 100 comprises an auxiliary power controller 105 configured for controlling the auxiliary power provided to the wind turbines 110, 120, 130. The auxiliary power controller 105 is configured for determining a maintenance or standby operation of the wind turbines 110, 120, 130. The auxiliary power controller 105 is configured for determining the auxiliary power requirements of each single wind turbine 110, 120, 130 and is configured for determining the power output of the auxiliary power unit 103.

Figure 2:
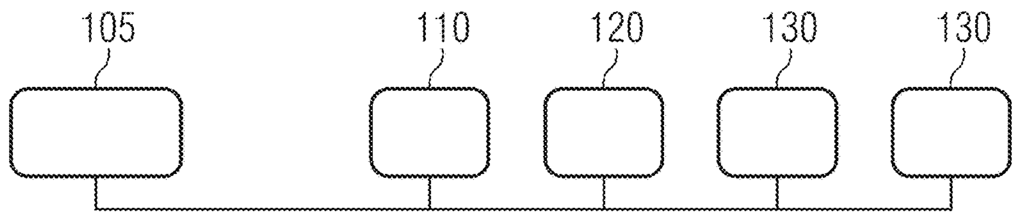
FIG. 2 shows a schematic view of an auxiliary power controller and an exemplary control procedure according to an exemplary embodiment of the present invention.

FIG. 2 shows a schematic view of an auxiliary power controller 105 and an exemplary control procedure according to an exemplary embodiment of the present invention.

The auxiliary power controller 105 controls on the basis of the of the available generated auxiliary power the supply of auxiliary power to the respective wind turbines 110, 120, 130. For example, if sufficient auxiliary power is available, all wind turbines 110, 120, 130 are supplied with auxiliary power in order to conduct maintenance and standby operations. If the sum of the required auxiliary power of the wind turbines 110, 120, 130 exceeds the generated auxiliary power, then the auxiliary power unit 103 is controlled by the auxiliary power controller 105 for transmitting subsequently the auxiliary power to the respective subsequently. For example, in a first time period, the first wind turbine 110 receives respective auxiliary power by the auxiliary power unit 103 and if the maintenance and standby operating procedures of the first wind turbine 110 have been finished, subsequently in a second time period, the second wind turbine 120 receives respective auxiliary power by the auxiliary power unit 103.

By the auxiliary power controller 105 the maximum power capacity of the auxiliary power line 102 can be considered and hence the auxiliary power line 102 must not be designed for the absolute maximum power case where all wind turbines 110, 120, 130 receives the maximal needed auxiliary power. Hence, the auxiliary power line 101 comprises a predetermined power threshold value for the transported auxiliary power through the auxiliary power line which can be considered by the auxiliary power controller 105. The power threshold value for the maximum power transmitted by the auxiliary power line 102 is in particular less than 300 kW.

For example, the wind turbines 110, 120, 130 may require 150 kW as maximum for maintenance mode (e.g. for yawing the nacelle or for pitching the blades) and around 50 kW in standby mode (e.g. for heaters, communication units or other standby equipment). The auxiliary power line 102 may be limited in its power capacity by the line diameter, material, etc. Hence, the maximum power capacity defines the threshold value. The auxiliary power controller 105 is scheduling the maintenance modes for the wind turbines 110, 120, 130 and allows for example only maintenance modes for the wind turbines 110, 120, 130 until the threshold value for the auxiliary line capacity is not exceeded.

Hence, in the example of four wind turbines 110, 120, 130, a load example may be: 50 kW+50 kW+50 kW+150 kw=300 kw, since three wind turbines 120, 130 are in the standby mode (50 kW power consumption) and only one wind turbine 110 is in the maintenance mode (150 kW power consumption). The wind turbine 110 is running in a maintenance mode, such as yawing the nacelle, pitching the blade, operating heat units, energizing of the transformer and other electrical components. Hence, in the example, a threshold value of 300 kW is not exceeded.

The wind turbines 110, 120, 130 request the auxiliary power controller 105 for power, if needed. The auxiliary power controller 105 schedules the activities (standby/maintenance operations) in the wind turbines 110, 120, 130 in order to prevent exceeding above the threshold value of the maximum power capacity of the auxiliary power line 102.

Furthermore, the wind turbine 110 that needs auxiliary power or is in a hazardous state is prioritized by the auxiliary power controller 105. The other wind turbines 120, 130 e.g. located on the same array are set on standby with a minimum power consumption in order to not exceed the threshold value. The wind turbine 110 can use all the auxiliary power needed to make the task. After the task has been finished the other wind turbines 120, 130 are enabled to use normal consumption again or may be driven in a maintenance mode.

Summarizing, if the design of the auxiliary power line 102 does only allow a maximum threshold value for the transmitted power, the auxiliary power controller 105 controls the auxiliary power in such a manner, that the maximum threshold value of the auxiliary power transmitted through the auxiliary power line 101 is met.

Figure 3:
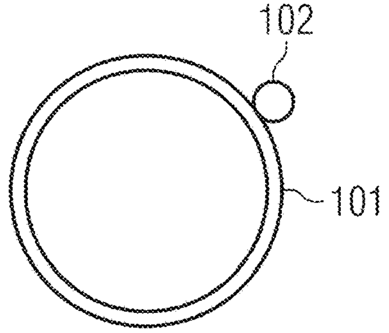
FIG. 3 shows a schematic view of a cross-section of a main line and an auxiliary power line according to an exemplary embodiment of the present invention.

FIG. 3 shows a schematic view of a cross-section of a main line 101 and an auxiliary power line 102 according to an exemplary embodiment of the present invention. The auxiliary cable/line 102 is attached to the main line 101, e.g. a gas pipeline. Also, communication cables (fibers) can be integrated in the auxiliary cable 102 or independently attached to the main line 101. The auxiliary power line 102 is configured for transmitting less than 500 kw, in particular less than 105 kW. In a further exemplary embodiment, the auxiliary power line 102 is designed for transmitting voltage less than 50 kV, specifically less than 10 kV, more specifically less than 1 kV. Accordingly, the auxiliary power line 102 is designed with a smaller capacity and accordingly a smaller diameter. As can be seen from FIG. 3, the diameter of the auxiliary power line 102 is much smaller than the diameter if the main line 101.

Figure 4:
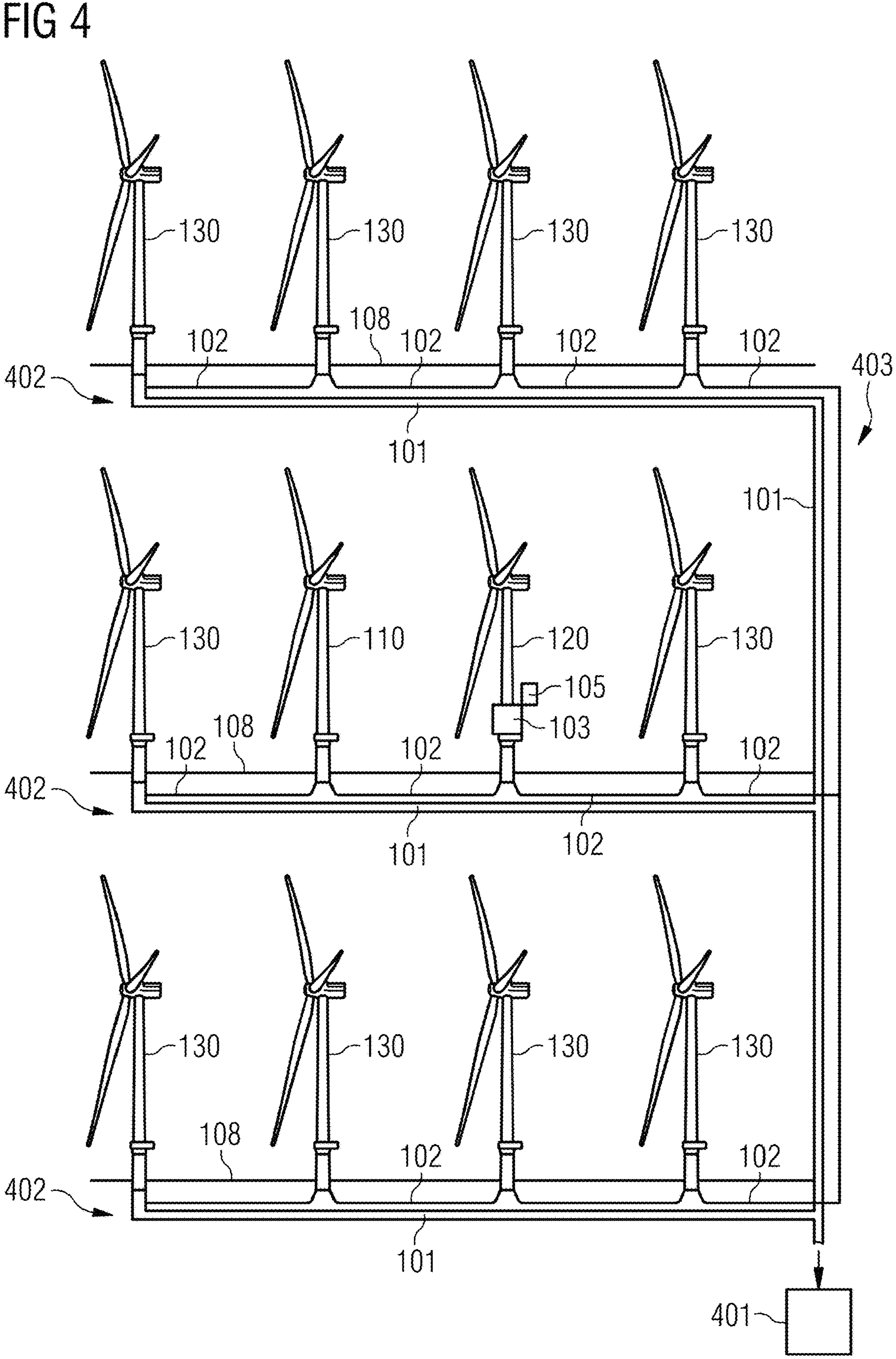
FIG. 4 shows a schematic view of a wind turbine park comprising a plurality of wind turbines connected in series and in parallel according to an exemplary embodiment of the present invention.

FIG. 4 shows a schematic view of a wind turbine park 100 comprising a plurality of wind turbines 110, 120, 130 connected in series and in parallel according to an exemplary embodiment of the present invention. In the example, four wind turbines 110, 120, 130 are connected with the main line 101 and the auxiliary line 102 in series along a respective string 402. Specifically more than seven, for example 8, wind turbines 110, 120, 130 are connected with the main line 101 and the auxiliary line 102 in series along a respective string 402. The strings 402 are connected in parallel to a central string 403. The part of the main line 101 in the main string 403 is coupled to an external power product grid 401, such as a power grid or a pipeline system, outside of the wind turbine park 100.

Hence, specifically the auxiliary line 102 can be connected by loop configurations to enable big clusters of wind turbines 110, 120, 130 which can be operated together by auxiliary power generated by a common auxiliary power unit 103.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A wind turbine park, comprising:

at least a first wind turbine and a second wind turbine for generating a power product, a main line connecting the first wind turbine and the second wind turbine for transporting the power product, an auxiliary power line being connected to the first wind turbine and the second wind turbine, wherein the auxiliary power line is configured for transporting auxiliary power for a wind turbine maintenance or standby operation to at least one of the first wind turbine and the second wind turbine, an auxiliary power unit for generating the auxiliary power to the first wind turbine and the second wind turbine, wherein the auxiliary power unit is connected to the auxiliary power line, an auxiliary power controller configured for controlling the auxiliary power provided to the first wind turbine and to the second wind turbine, wherein the auxiliary power controller is configured for determining a maintenance or standby operation of the first wind turbine and the second wind turbine.

2. The wind turbine park according to claim 1, wherein the auxiliary power line is configured for transmitting less than 1 MW.

3. The wind turbine park according to claim 1, wherein the power product is electrical power, wherein the main line is an electrical power line for transporting the generated electrical power.

4. The wind turbine park according to claim 1, wherein the power product is a power fluid, wherein the main line is a fluid pipe for transporting the generated power fluid.

5. The wind turbine park according to claim 4, wherein at least one of the first wind turbine and the second wind turbine comprises an electrolyzer unit for generating hydrogen and/or oxygen as power fluid.

6. The wind turbine park according to claim 1, wherein the auxiliary power unit is mounted to the first wind turbine, wherein in particular the second wind turbine is free of a further auxiliary power unit.

7. The wind turbine park according to claim 1, wherein the auxiliary power unit is mounted to an auxiliary power platform being spaced apart from the first wind turbine and the second wind turbine.

8. The wind turbine park according to claim 1, wherein the auxiliary power unit is a battery, wherein the battery is in particular chargeable by electrical power generated by at least one of the first wind turbine and the second wind turbine and/or, wherein the auxiliary power unit is a fuel cell being operated by the power product.

9. The wind turbine park according to claim 1, wherein the auxiliary power line comprises a predetermined power threshold value for the transported auxiliary power through the auxiliary power line, wherein the power threshold value is less than 500 kW, wherein the auxiliary power controller is configured for providing auxiliary power to the first wind turbine and to the second wind turbine under consideration of the predetermined power threshold value.

10. The wind turbine park according to claim 9, wherein the auxiliary power controller is configured to provide auxiliary power subsequently first to the first wind turbine and subsequent to the second wind turbine if the total required auxiliary power of the first wind turbine and the second wind turbine in sum exceeds the power threshold value of the auxiliary power line.

11. The wind turbine park according to claim 9, wherein the auxiliary power controller is configured for controlling the maintenance or standby operation of at least one of the first wind turbine and the second wind turbine.

12. The wind turbine park according to claim 11, wherein the maintenance or standby operation comprises a plurality of maintenance or standby tasks, wherein the auxiliary power controller is configured for controlling the timing of the maintenance or standby tasks in order to comply with the power threshold value of the auxiliary power line.

13. The wind turbine park according to claim 1, wherein the wind turbine park is decoupled from a power grid.

14. A method of operating a wind turbine park according to claim 1, the method comprising generating a power product by at least one of the first wind turbine and the second wind turbine, transporting the power product by the main line, generating auxiliary power by the auxiliary power unit, transporting by the auxiliary power line auxiliary power for a maintenance or standby operation to at least one of the first wind turbine and the second wind turbine.

* * * * *